(12) United States Patent
Ishida

(10) Patent No.: US 7,162,342 B2
(45) Date of Patent: Jan. 9, 2007

(54) ELECTRONIC CONTROL UNIT AND PASSENGER DETECTION APPARATUS FOR VEHICLE

(75) Inventor: Shoichi Ishida, Novi, MI (US)

(73) Assignee: Denso Corporation, Kariya (JP)

( * ) Notice: Subject to any disclaimer, the term of this patent is extended or adjusted under 35 U.S.C. 154(b) by 334 days.

(21) Appl. No.: 10/758,244

(22) Filed: Jan. 16, 2004

(65) Prior Publication Data

US 2004/0162657 A1 Aug. 19, 2004

(30) Foreign Application Priority Data

Jan. 21, 2003 (JP) ............... 2003-012352

(51) Int. Cl.
*G05D 1/00* (2006.01)
*G06F 7/00* (2006.01)
*E05F 15/00* (2006.01)
*B60R 22/00* (2006.01)

(52) U.S. Cl. ............... 701/45; 701/36; 307/9.1; 280/734; 280/735; 331/2

(58) Field of Classification Search ............ 701/45–47, 701/36; 280/734–736; 340/425.5, 438; 331/2, 58; 324/202; 307/9.1, 10.1, 10.6, 307/10.7
See application file for complete search history.

(56) References Cited

U.S. PATENT DOCUMENTS 4,051,663 A 10/1977 Chihara et al.
4,887,024 A * 12/1989 Sugiyama et al. .......... 324/674
5,987,339 A 11/1999 Asano
6,084,441 A 7/2000 Kawai
6,087,598 A * 7/2000 Munch ........................ 177/144

FOREIGN PATENT DOCUMENTS

| JP | B2-S58-7190 | 2/1983 |
| JP | A-H06-342088 | 12/1994 |
| JP | A-H10-49251 | 2/1998 |
| JP | A-H10-190568 | 7/1998 |
| JP | 2002-243528 | 8/2002 |
| JP | A-2002-228778 | 8/2002 |

* cited by examiner

*Primary Examiner*—Y. Beaulieu
(74) *Attorney, Agent, or Firm*—Posz Law Group, PLC

(57) ABSTRACT

In a passenger detection apparatus for a vehicle, a microcomputer conducts a timer counting operation using a sub-clock signal fed from an CR oscillation circuit in a stand-by state and carries out a zero-point correction on a load sensor in an activated state. In addition, the microcomputer calibrates the accuracy of the timer count through the use of a main clock signal fed from a crystal oscillator. This enables the timer count to be conducted in a low current dissipation state by the CR oscillation circuit, and enables the accuracy of the timer count to be surely maintained through the calibration based on the main clock signal.

28 Claims, 6 Drawing Sheets

ELECTRONIC CONTROL UNIT AND PASSENGER DETECTION APPARATUS FOR VEHICLE

BACKGROUND OF THE INVENTION

1) Field of the Invention

The present invention relates to an electronic control unit for a vehicle, and more particularly to a vehicle passenger detection apparatus designed to make a decision on a state of a passenger or occupant (including a driver) sitting on a seat in a vehicle for transmitting the passenger state to a vehicle passenger protection device.

2) Description of the Related Art

So far, there has been proposed a passenger detection apparatus for a vehicle in which, for the purpose of changing a spread quantity of an air bag according to type of passenger, distortion type load sensors are located at a plurality of portions on a seat rail of the vehicle to measure a load (that is, a weight of the passenger) on a vehicle seat for making a decision on, in addition to the presence or absence of a seated passenger, the type of the seated passenger such as adult/child.

For example, as shown in FIG. 7, a conventional vehicle passenger detection apparatus 101 is principally made up of a power supply circuit 11, a signal voltage comparator 12, a microcomputer 130, a timer circuit 18, a current dissipation cutting circuit 14, a circuit 17 requiring a large current dissipation (consumption), and others. The power supply circuit 11 is connected through a power supply line 21 to a vehicle battery 2 to output a 5-V voltage through its VO terminal. Moreover, the vehicle battery 2 is connected through an ignition key switch 3 to the signal voltage comparator 12.

When the vehicle battery 2 is connected to the vehicle passenger detection apparatus 101, the power supply circuit 11 is powered through the power supply line 21. The power supply circuit 11 regulates the battery voltage to supply a 5-V voltage to the microcomputer 130 and the timer circuit 18. In response to the supply of the 5-V voltage, the microcomputer 130 starts its operation and works in accordance with a clock signal from a crystal oscillator 15. The microcomputer 130 implements predetermined arithmetic operation and control and then stops the generation of the clock signal in the crystal oscillator 15 for reducing the current dissipation.

On the other hand, the timer circuit 18 starts its counting operation in accordance with a clock signal from a CR oscillation circuit 16. When the count of a preset timer activation time reaches completion, the timer circuit 18 outputs a timer signal representative of the satisfaction of a timer activation time count condition to generate an external interrupt to the microcomputer 130. Upon receipt of the external interrupt, the microcomputer 130 starts the clock operation through the use of the crystal oscillator 15 which has so far been placed into a stopped state. Moreover, when needed, it turns on the current dissipation cutting circuit 14 to supply the voltage through an external power supply terminal 23 further to the external circuits including load sensors 31 to 34. On the other hand, the microcomputer 130 receives load detection values from the load sensors 31 to 34 through an external signal input terminal 24 and, when making a decision on the basis of the load detection values therefrom that a vehicle seat is in an unoccupied state, implements the zero-point correction (correction of the load detection value in an unoccupied state) on the load sensors. After the completion of the zero-point correction on the load sensors, the microcomputer 130 turns off the current dissipation cutting circuit 14 and stops the clock generation of the crystal oscillator 15 for the reduction of the current dissipation, and conducts the counting operation through the use of only the timer circuit 18.

In response to the turning-on of the ignition key switch (IG-SW) 3, a battery voltage is applied through an IG terminal 22 to the signal voltage comparator 12. When the inputted voltage to the signal voltage comparator 12 exceeds a reference (Ref) voltage, the signal voltage comparator 12 outputs an IG-SW signal to make an external interrupt on the microcomputer 130. Upon receipt of the external interrupt, the microcomputer 130 starts the clock operation through the use of the crystal oscillator 15 which has been in a stopped state. Moreover, it turns on the current dissipation cutting circuit 14 to supply the voltage through the external power supply terminal 23 further to the external circuits such as the load sensor 31. The microcomputer 130 receives the load detection values from the load sensors 41 to 34 through the external signal input terminal 24 and, on the basis of the load detection values, makes a decision, for example, on the presence or absence of a seated passenger and on whether the passenger is an adult or .child. This decision result is outputted through an external signal output terminal 25 to an air bag ECU 40. Incidentally, the timer circuit 18 continues the timer counting operation (timer count) even during the IG-ON (turning-on of the ignition key switch 3).

When the ignition key switch (IG-SW) 3 is turned off, the voltage at the IG terminal 22 becomes $_0$V. Thus, the inputted voltage to the signal voltage comparator 12 becomes below the Ref voltage and, hence, the signal voltage comparator 12 stops the output of the IG-SW ON signal. In response to the output stop of the IG-SW ON signal, the microcomputer 130 terminates the passenger state decision processing and turns off the current dissipation cutting circuit 14 and stops the clock operation through the crystal oscillator 15.

Accordingly, in the conventional vehicle passenger detection apparatus 101, during the stand-by, the timer circuit 18 produces a clock through the CR oscillation to carry out the timer counting operation at a low frequency for achieving the low current dissipation, while in the timer activated condition, the microcomputer 130 conducts the clock operation through the crystal oscillator 15 so as to surely make the zero-point correction on the load sensors 31 to 34.

There is a problem which arises with the above-described conventional vehicle passenger detection apparatus 101, however, in that, since timer circuit 18 produces a clock through the CR oscillation to conduct the timer counting operation and supplies a timer signal to the microcomputer 130 at the satisfaction of a timer activation condition to activate it, the timer count error increases in a case in which the CR oscillation frequency varies due to factors such as temperature variations or deterioration. In addition, there is a case in which due to the timer count error difficulty is encountered in carrying out the zero-point correction on the load sensors in a constant cycle, which can make it difficult to implement the passenger decision with high accuracy.

SUMMARY OF THE INVENTION

The present invention has been developed with a view to eliminating the above-mentioned problems, and it is therefore an object of the invention to provide a vehicle electronic control unit and vehicle passenger detection apparatus capable of achieving a timer counting operation with high accuracy by conducting the timer counting operation in a low current dissipation condition during a stand-by state and calibrating the accuracy at the activation.

For this purpose, in accordance with a first aspect of the present invention, there is provided an electronic control unit for a vehicle which is made to carry out a count through the use of a timer in response to a direct power supply from a battery and to fall into a stand-by state and which is placed into an activation when a count value reaches a preset timer activation time or when an ignition key is turned on, the control unit comprising first oscillation means for supplying a main clock signal at the activation and second oscillation means for supplying a sub-clock signal to carry out the timer count, with the accuracy of the timer counting operation using the sub-clock signal being calibrated through the use of the main clock signal.

Thus, the timer counting operation is conducted on the basis of the sub-clock signal fed from the second oscillation means and the accuracy of the timer count according to the sub-clock signal is calibrated through the use of the main clock signal fed from the first oscillation means. This enables the timer counting operation to be conducted on the basis of the sub-clock signal from the second oscillation means in a low current dissipation condition during a stand-by state and further enables the timer count using the sub-clock signal to be certainly calibrated (corrected) in accuracy through the use of the main clock signal from the first oscillation means having a high accuracy and a high stability during the activation.

In this control unit, the oscillation frequency of the second oscillation means is lower than the oscillation frequency of the first oscillation means.

Accordingly, the timer counting operation can be conducted in a low current dissipation condition by means of the sub-clock signal fed from the second oscillation means having an oscillation frequency lower than that of the first oscillation means.

In addition, in this control unit, the first oscillation means comprises an oscillator using mechanical resonance while the second oscillation means comprises an oscillator using electrical resonance.

Thus, the accuracy of timer count using the sub-clock signal supplied from the second oscillation means comprising a low-priced oscillator using electrical resonance can be calibrated with high precision through the use of the main clock signal supplied from the first oscillation means comprising an oscillator using mechanical resonance which provides a high frequency accuracy and stability.

Still additionally, in this control unit, the first oscillation means comprises a crystal oscillator or a ceramic oscillator while the second oscillation means comprises a CR oscillation circuit.

Accordingly, the accuracy of the timer count using the sub-clock signal supplied from the second oscillation means comprising a low-priced CR oscillation circuit can be calibrated with high precision through the use of the main clock signal supplied from the crystal oscillator or the ceramic oscillator which provides a high frequency accuracy and stability.

Yet additionally, this control unit comprises a microcomputer which conducts its clock operation on the basis of the main clock signal fed from the first oscillation means, and the first and second oscillation means are incorporated into the microcomputer.

Thus, since the first and second oscillation means are built in the microcomputer clock-operating on the basis of the main clock signal fed from the first oscillation means, the accuracy of the timer count using the sub-clock signal fed from the second oscillation means can surely be calibrated with a simple configuration.

Moreover, this control unit comprises a microcomputer made to clock-operate on the basis of the main clock signal fed from the first oscillation means and a timer circuit made to clock-operate on the basis of the sub-clock signal fed from the second oscillation means, with a clock waveform outputted from the timer circuit being externally inputted to the microcomputer.

Therefore, the timer counting operation is conducted in a manner such that a clock waveform outputted from the timer circuit clock-operating on the basis of the sub-clock signal from the second oscillation means is externally inputted to the microcomputer, and the timer count accuracy can certainly be calibrated through the use of the main clock signal from the first oscillation means.

Still moreover, in this control unit, the sub-clock signal is counted with respect to a given (predetermined) count value of the main clock signal, and the accuracy of the timer count using the sub-clock signal is calibrated on the basis of the sub-clock count result.

That is, in a case in which the main clock signal and the sub-clock signal are counted at the same time, the count value of the sub-clock signal relative to a given count value of the main clock signal varies due to the variation of the sub-clock signal. For this reason, the sub-clock signal is counted with respect to a given count value of the main clock signal, and the accuracy of the timer count according to the sub-clock signal is calibrated on the basis of the sub-clock count result.

Yet moreover, this control unit comprises storage means in which the sub-clock count result and a sub-clock count value corresponding to the timer activation time are stored in a state where they are associated with each other.

Thus, by referring to storage means storing the sub-clock count result and the sub-clock count value corresponding to the timer activation time in a state where they are associated with each other, the arithmetic processing load is reducible and, even if the sub-clock count value corresponding to the timer activation time shows a non-linear characteristic, the timer count can be calibrated with high precision.

In addition, in this control unit, the sub-clock count value corresponding to the timer activation time is calculated on the basis of the sub-clock count result.

Since the sub-clock count value corresponding to the timer activation time is calculated on the basis of the sub-clock count result, the certain calibration of the timer count becomes feasible.

Additionally, in this control unit, the main clock signal is counted with respect to a given count value of the sub-clock signal, and the accuracy of the timer count using the sub-clock signal is calibrated on the basis of the main clock count result.

That is, in a case in which the main clock signal and the sub-clock signal are counted at the same time, the main clock count value relative to a given count value of the sub-clock signal varies due to the variation of the sub-clock signal. For this reason, the main clock signal is counted with respect to the given sub-clock count value, and the timer count accuracy according to the sub-clock signal is calibrated on the basis of the main clock count result.

Still additionally, this control unit comprises storage means in which the main clock count result and a sub-clock count value corresponding to the timer activation time are stored in a state where they are associated with each other.

Thus, by referring to storage means storing the main clock count result and the sub-clock count value corresponding to the timer activation time in a state where they are associated with each other, the arithmetic processing load is reducible and, even if the sub-clock count value corresponding to the timer activation time shows a non-linear characteristic, the timer count can be calibrated with high precision.

Yet additionally, in this control unit, the sub-clock count value corresponding to the timer activation time is calculated on the basis of the main clock count result. Since the sub-clock count value corresponding to the timer activation time is calculated on the basis of the main clock count result, the certain calibration of the timer count becomes feasible.

Yet additionally, in this control unit, whenever the activation is made periodically through the timer count using the sub-clock signal, the accuracy of the timer count using the sub-clock signal is calibrated through the use of the main clock signal.

Since the accuracy of the timer count using the sub-clock signal is calibrated through the use of the main clock signal whenever the activation is made periodically through the timer counting operation according to the sub-clock signal, a high timer count accuracy is maintainable at all times.

Furthermore, in accordance with another aspect of the present invention, there is provided a passenger detection apparatus for a vehicle made to detect a load on a vehicle seat through the use of a load sensor for making a decision on a state of a passenger on the basis of the load detection result and to implement a count through a timer upon receipt of direct power supply from a battery and take a stand-by condition and made to be activated when a count value reaches a preset timer activation time for carrying out a zero-point correction on the load sensor, the detection apparatus comprising first oscillation means for supplying a main clock signal at the activation and second oscillation means for supplying a sub-clock signal to implement the timer count, with the accuracy of the timer count using the sub-clock signal being calibrated through the use of the main clock signal.

Thus, the timer counting operation is conducted with the sub-clock signal fed from the second oscillation means and the accuracy of the timer count using the sub-clock signal is calibrated with the main clock signal fed from the first oscillation means. This enables the timer count to be conducted on the basis of the sub-clock signal from the second oscillation means in a low current dissipation condition during a stand-by state and further enables the timer count using the sub-clock signal to be certainly calibrated in accuracy through the use of the main clock signal from the first oscillation means having a high accuracy and a high stability during the activation. Therefore, it is possible to carry out the zero-point correction on the load sensor in a predetermined cycle for always making a high-precision decision on a passenger state on the basis of the lead detection result.

In this detection apparatus, the oscillation frequency of the second oscillation means is lower than the oscillation frequency of the first oscillation means.

Accordingly, the timer counting operation can be conducted in a low current dissipation condition by means of the sub-clock signal fed from the second oscillation means having an oscillation frequency lower than that of the first oscillation means.

In addition, in this detection apparatus, the first oscillation means comprises an oscillator using mechanical resonance while the second oscillation means comprises an oscillator using electrical resonance.

Thus, the accuracy of the timer count using the sub-clock signal supplied from the second oscillation means comprising a low-priced oscillator using electrical resonance can be calibrated with high precision through the use of the main clock signal supplied from the first oscillation means comprising an oscillator using mechanical resonance which provides a high frequency accuracy and stability.

Still additionally, in this detection apparatus, the first oscillation means comprises a crystal oscillator or a ceramic oscillator while the second oscillation means comprises a CR oscillation circuit.

Accordingly, the accuracy of the timer count using the sub-clock signal supplied from the second oscillation means comprising a low-priced CR oscillation circuit can be calibrated with high precision through the use of the main clock signal supplied from the crystal oscillator or the ceramic oscillator which provides a high frequency accuracy and stability.

Yet additionally, this detection apparatus comprises a microcomputer which conducts its clock operation on the basis of the main clock signal fed from the first oscillation means, and the first and second oscillation means are incorporated into the microcomputer.

Thus, since the first and second oscillation means are built in the microcomputer clock-operating on the basis of the main clock signal fed from the first oscillation means, the accuracy of the timer count using the sub-clock signal fed from the second oscillation means can surely be calibrated with a simple configuration.

Moreover, this detection apparatus comprises a microcomputer made to clock-operate on the basis of the main clock signal fed from the first oscillation means and a timer circuit made to clock-operate on the basis of the sub-clock signal fed from the second oscillation means, with a clock waveform outputted from the timer circuit being externally inputted to the microcomputer.

Therefore, the timer counting operation is conducted in a manner such that a clock waveform outputted from the timer circuit clock-operating on the basis of the sub-clock signal from the second oscillation means is externally inputted to the microcomputer, and the timer count accuracy can certainly be calibrated through the use of the main clock signal from the first oscillation means.

Still moreover, in this detection apparatus, the sub-clock signal is counted with respect to a given count value of the main clock signal, and the accuracy of the timer count using the sub-clock signal is calibrated on the basis of the sub-clock count result.

That is, in a case in which the main clock signal and the sub-clock signal are counted at the same time, the sub-clock count value relative to a given count value of the main clock signal varies due to the variation of the sub-clock signal. For this reason, the sub-clock signal is counted with respect to a given count value of the main clock signal, and the accuracy of the timer count according to the sub-clock signal is calibrated on the basis of the sub-clock count result.

Yet moreover, this detection apparatus comprises storage means in which the sub-clock count result and a sub-clock count value corresponding to the timer activation time are stored in a state where they are associated with each other.

Thus, by referring to storage means storing the sub-clock count result and the sub-clock count value corresponding to the timer activation time in a state where they are associated with each other, the arithmetic processing load is reducible and, even if the sub-clock count value corresponding to the timer activation time shows a non-linear characteristic, the timer count can be calibrated with high precision.

In addition, in this detection apparatus, the sub-clock count value corresponding to the timer activation time is calculated on the basis of the sub-clock count result.

Since the sub-clock count value corresponding to the timer activation time is calculated on the basis of the sub-clock count result, the certain calibration of the timer count becomes feasible.

Additionally, in this detection apparatus, the main clock signal is counted with respect to a given count value of the sub-clock signal, and the accuracy of the timer count using the sub-clock signal is calibrated on the basis of the main clock count result.

That is, in a case in which the main clocks and the sub-clocks are counted at the same time, the main clock count value relative to a given sub-clock count value varies due to the variation of the sub-clock signal. For this reason, the main clocks are counted with respect to the given sub-clock count value, and the timer count accuracy according to the sub-clock signal is calibrated on the basis of the main clock count result.

Still additionally, this detection apparatus comprises storage means in which the main clock count result and a sub-clock count value corresponding to the timer activation time are stored in a state where they are associated with each other.

Thus, by referring to storage means storing the main clock count result and the sub-clock count value corresponding to the timer activation time in a state where they are associated with each other, the arithmetic processing load is reducible and, even if the sub-clock count value corresponding to the timer activation time shows a non-linear characteristic, the timer count can be calibrated with high precision.

Yet additionally, in this detection apparatus, the sub-clock count value corresponding to the timer activation time is calculated on the basis of the main clock count result. Since the sub-clock count value corresponding to the timer activation time is calculated on the basis of the main clock count result, the certain calibration of the timer count becomes feasible.

Yet additionally, in this detection apparatus, whenever the activation is made periodically through the timer count using the sub-clock signal, the accuracy of the timer count using the sub-clock signal is calibrated through the use of the main clock signal.

Since the accuracy of the timer count using the sub-clock signal is calibrated through the use of the main clock signal whenever the activation is made periodically through the timer counting operation according to the sub-clock signal, a high timer count accuracy is maintainable at all times.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
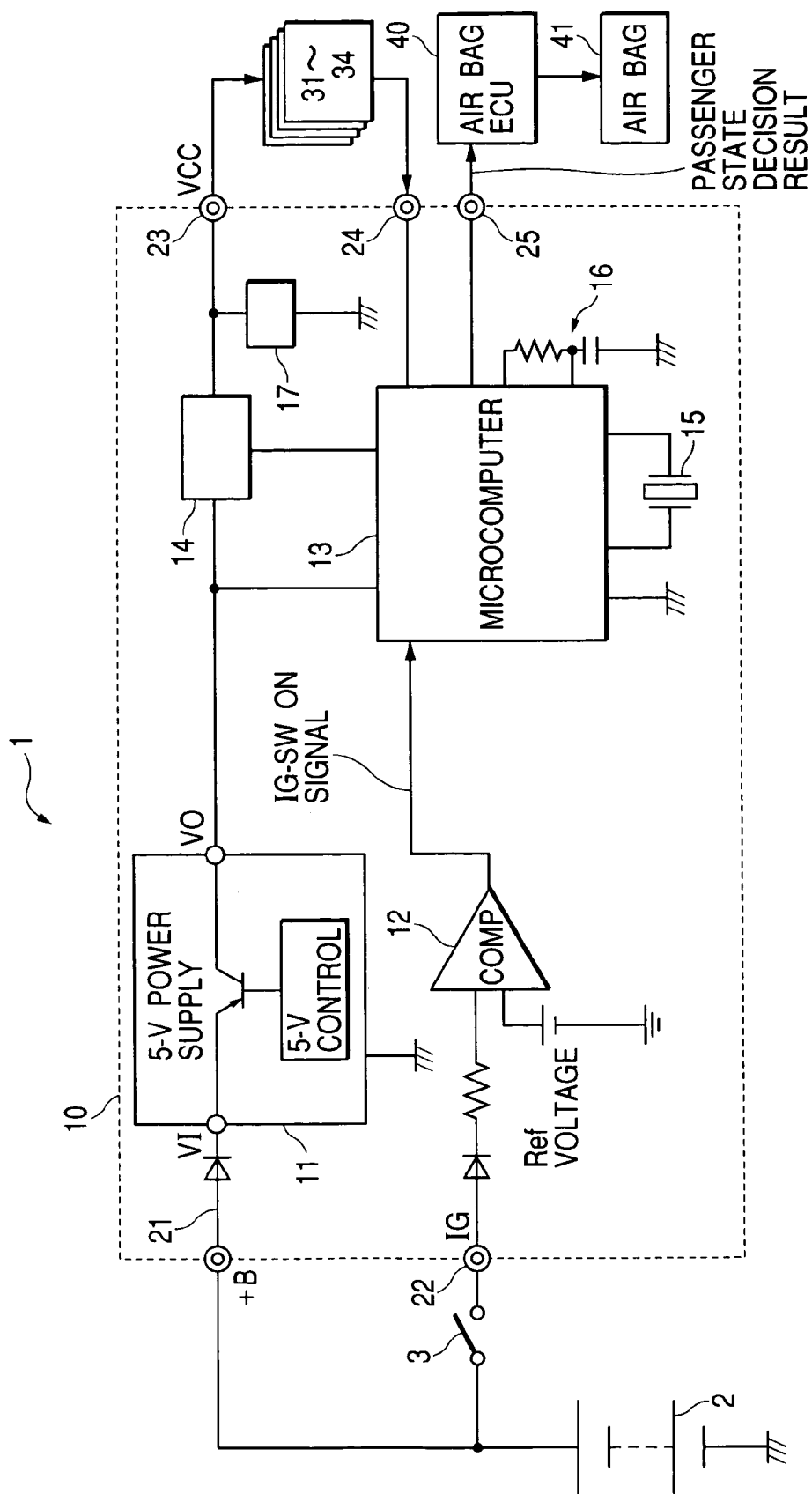
FIG. 1 is a block diagram showing a hardware configuration of a vehicle passenger detection apparatus according to a first embodiment of the present invention.

Referring to the drawings, a description will be given hereinbelow of a vehicle electronic control unit and a vehicle passenger detection apparatus according to embodiments of the present invention.

Figure 2:
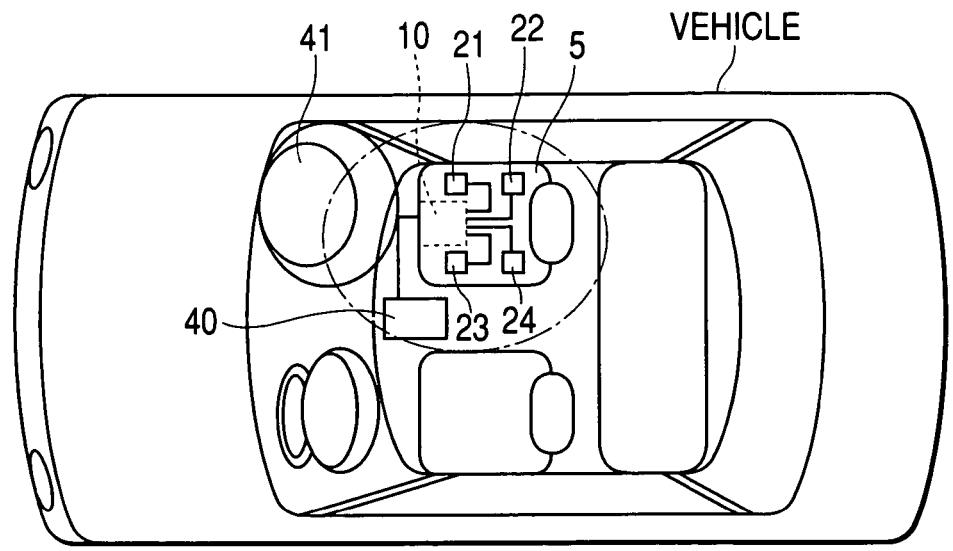
FIG. 2 is a plan view schematically showing a vehicle showing a location of the vehicle passenger detection apparatus.
Figure 3:
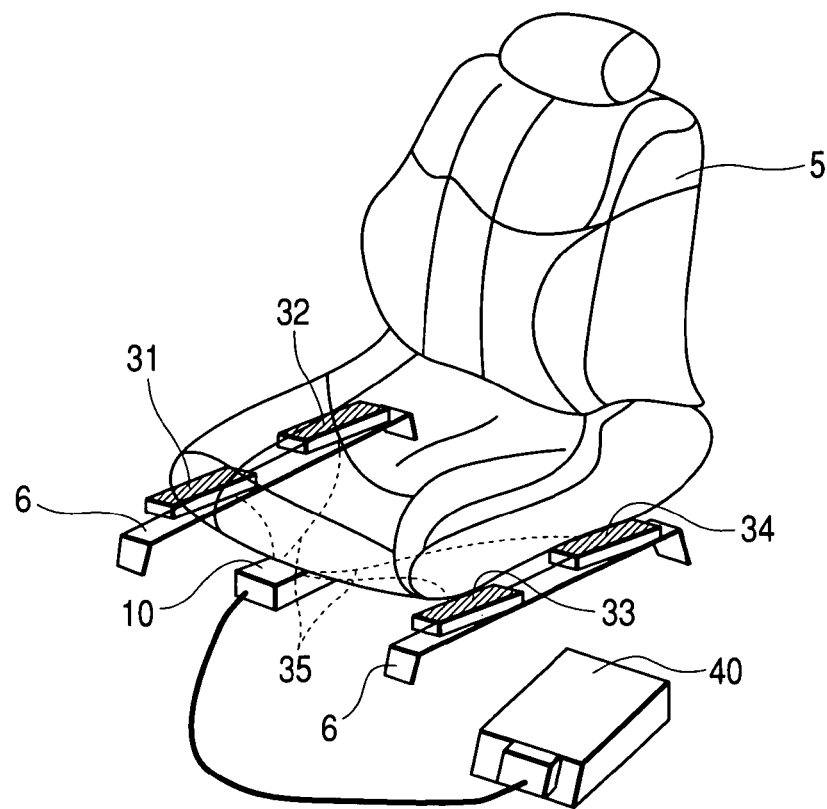
FIG. 3 is a perspective illustration of a vehicle seat and the vicinity thereof, showing the located vehicle passenger detection apparatus.
Figure 4:
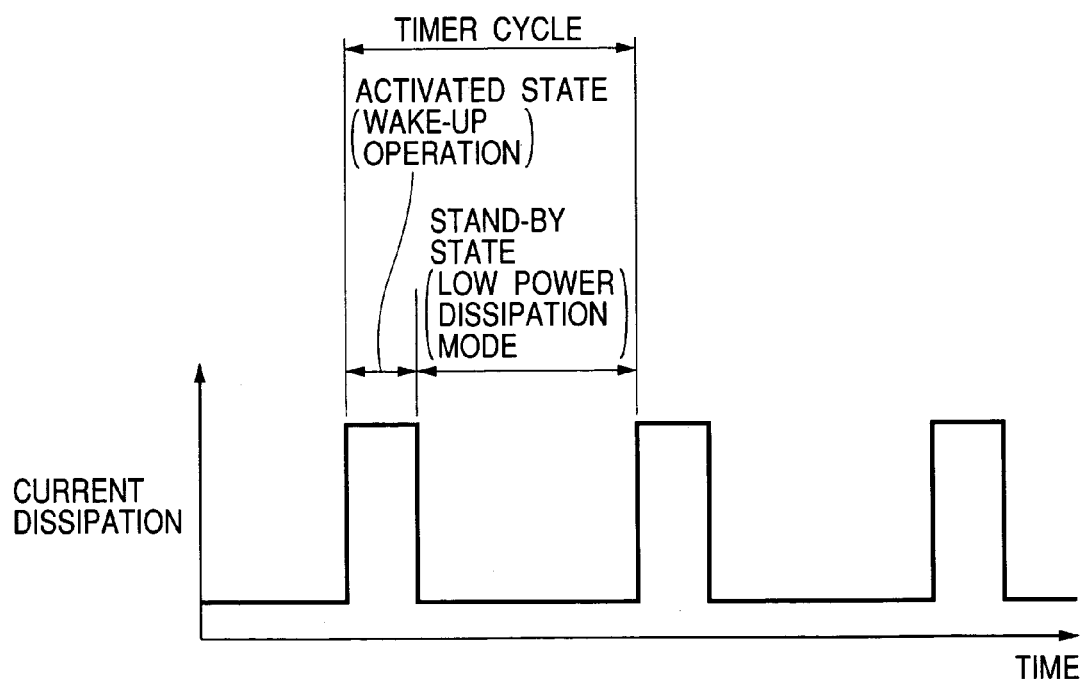
FIG. 4 is a graphic illustration of one example of current dissipation variation when a stand-by state and an activated state are repeatedly taken through the use of a timer function.

FIG. 1 is a block diagram showing a hardware configuration of a vehicle passenger detection apparatus according to a first embodiment, and FIG. 2 is a plan view schematically showing the location of components constituting the vehicle passenger detection apparatus in a vehicle. Moreover, FIG. 3 is a perspective illustration of a vehicle seat and the vicinity thereof (portion indicated by a chain line in FIG. 2), showing the located components in the vehicle, and FIG. 4 is a graphic illustration of one example of current dissipation variation in a passenger detection electronic control unit.

As FIG. 1 shows, the vehicle passenger detection apparatus, generally designated at reference numeral 1, is made up of a passenger detection electronic control unit (which will be referred to hereinafter as a "passenger detection ECU") 10 and a plurality of (for example, four) distortion type load sensors 31, 32, 33 and 34. The passenger detection ECU 10 corresponds to an electronic control unit for a vehicle in the present invention and the distortion type load sensors 31 to 34 constitute a load sensor therein.

The passenger detection ECU 10 is located under a vehicle seat 5 (see FIGS. 2 and 3) and, as shown in FIG. 1, is principally composed of a power supply circuit 11, a signal voltage comparator 12, a microcomputer 13, a current dissipation cutting circuit 14, a circuit 17 requiring a large current dissipation (consumption), and others.

The power supply circuit 11 is connected through a power supply line 21 to a vehicle battery 2 to regulate a battery voltage (for example, 12V) from the vehicle battery 2 for outputting a 5-V voltage through its VO terminal. Moreover, the vehicle battery 2 is connected through an ignition key switch 3 to the signal voltage comparator 12. The signal voltage comparator 12 compares an inputted voltage with a reference (Ref) voltage to output a signal on the basis of the comparison result.

The microcomputer 13 is principally composed of a CPU, a ROM, a RAM, and A/D converter and others, and upon receipt of the supply of a 5-V voltage from the power supply circuit 11, the CPU reads out a passenger detection processing program, a load sensor zero-point correction program and a timer error calibration program from the ROM and implements these programs. Moreover, in the ROM, there are stored an unoccupied-seat threshold, a passenger decision threshold and a reference table for timer error calibration (correction) which will be mentioned later. Still moreover, the RAM includes an area to be used as a work area by the CPU, and others. The A/D converter receives analog voltage signals from the distortion type load sensors 31 to 34 through transmission lines 35 to convert the load data into digital data. The microcomputer 13 internally includes a crystal oscillator 15 for producing an operation clock signal when activated and an CR oscillation circuit 16 for producing a timer counted clock signal. The crystal oscillator 15 corresponds to the first oscillation means and an oscillator using mechanical resonance, and the CR oscillation circuit 16 corresponds to the second oscillation means and an oscillator using electrical resonance.

The employment of the CR oscillation circuit for the timer counted clock signal can provide various advantages. For example, a 32.768-kHz low-frequency crystal oscillator for time measurement used in general is expensive and large in size, while the CR oscillation circuit is cheaper than a crystal oscillator or a ceramic oscillator and requires a less mounting area because resistor and a capacitor are small in size. In addition, usually, the current dissipation decreases as the oscillation frequency becomes lower, and the oscillation frequency of the CR oscillation circuit can be set to be low, thus achieving a low current dissipation. Still additionally, when the CR oscillation circuit is employed for timer counting, a low-priced crystal oscillator or ceramic oscillator of 8 MHz to 20 MHz is employable for an operation clock signal for the CPU without using a 32.768-kHz oscillator.

As shown in FIGS. 2 and 3, the distortion type load sensors 31 to 34 are located at front-right, front-left, rear-right and rear-left portions on seat rails 6 of the vehicle seat 5, respectively. The load sensors 31 to 34 are made to output the data on the loads applied onto the respective portions of the vehicle seat 5 in the form of analog voltage signals. These load sensors 31 to 34 are connected through the transmission lines 35 to the passenger detection ECU 10 to operate upon receipt of a power supply from the power supply circuit 11 in the passenger detection ECU 10 and to transmit the load data to the A/D converter in the passenger detection ECU 10.

An air bag ECU 40 is a control unit for carrying out the spread control on an air bag 41 serving as a vehicle passenger protecting device and, as shown in FIGS. 2 and 3, is connected through a communication line to the passenger detection ECU 10 located in the interior of the vehicle. When detecting the occurrence of a vehicle collision through the use of a G sensor (not shown), in accordance with a passenger state decision result transmitted from the passenger detection ECU 10 through an external signal output terminal 25, the air bag ECU 40 executes the spread control on the air bag 41, that is, executes the implementation/stop control on the air bag spreading according to the type of a passenger (adult/child, or the like).

For example, if the passenger state information transmitted from the passenger detection ECU 10 indicates "unoccupied seat", the air bag ECU 40 does not conduct the air bag spreading even in the case of the detection of a vehicle collision. Moreover, if a vehicle collision is detected and the passenger state information indicates that the passenger is an "adult", the air bag 41 is controlled to be spread up to a maximum. On the other hand, if a vehicle collision is detected and the passenger state information indicates a "child", for example, the control is executed to suppress or stop the spreading of the air bag 41.

Secondly, a description will be given hereinbelow of operations to be conducted when the vehicle passenger detection apparatus 1 carries out the passenger detection processing, the load sensor zero-point correction processing and the timer accuracy calibration processing. For carrying out these processing, the CPU of the microcomputer 13 reads out processing programs from the ROM and executes them.

First of all, when the vehicle battery 2 is connected to the vehicle passenger detection apparatus 1, the power supply circuit is powered through the power supply line 21. The power supply circuit 11 regulates the battery voltage (for example, 12V) to supply a 5-V voltage through a VO terminal to the microcomputer 13. The microcomputer 13 starts up to operate on the basis of a clock signal (which will be referred to hereinafter as a "main clock signal") from the crystal oscillator 15. At the same time, the CR oscillation circuit 16 generates a clock signal (which will be referred to hereinafter as a "sub-clock signal"). The microcomputer 13 makes a comparison between a count value of a main-clock timer based on the crystal oscillator 15 and a sub-clock timer based on the CR oscillation circuit 16 to calibrate (correct) an error of the sub-clock timer. That is, since the CR oscillation circuit 16 has a relatively low frequency accuracy and a relatively low stability so that the sub-clock timer tends to easily create an timer error, the accuracy calibration on the sub-clock timer is made through the use of the main-clock timer based on the crystal oscillator 15 having a high frequency accuracy and a high stability. A timer error calibration method and a detailed internal configuration of the microcomputer 13 will be described later. After the completion of the timer error calibration, the main-clock system stops its operation to come into a low current dissipation mode while the sub-clock timer carries out its counting operation (timer counting operation).

When the sub-clock timer reaches a count value corresponding to a preset timer activation time, the main-clock timer based on the crystal oscillator 15, which has been in a stopped state, starts up. Moreover, when needed, the current dissipation cutting circuit 14 is turned on to supply the voltage through the external power supply terminal 23 to external circuits such as the load sensors 31 to 34. The microcomputer 13 receives load detection values from the load sensors 31 to 34 through the external signal input terminal 24 to make a decision on the basis of the load detection values as to whether the vehicle seat 5 is in an unoccupied state and, if the decision shows the unoccupied state, implements the zero-point correction on the load sensors 31 to 34. This "load sensor zero-point correction" signifies a correction on a deviation from a zero point in a case in which the load sensor output in the unoccupied state deviates from a designed target value (zero point) due to variation of temperature/humidity, aged deterioration or the like.

When the completion of the zero-point correction on the load sensors 31 to 34, the microcomputer 13 turns off the current dissipation cutting circuit 14 to again make a comparison between the count value of the main-clock timer and the count value of the sub-clock timer for carrying out the calibration on the sub-clock timer error. After the calibration, for the low current dissipation, the main-clock system comes into an operation stop mode while only the sub-clock timer carries out the counting operation. That is, the vehicle passenger detection apparatus 1 shifts to a stand-by state and starts the counting for the next timer activation (wake-up). Moreover, whenever the sub-clock timer indicates the satisfaction of a timer activation condition, the passenger detection ECU 10 is put into activation and, as shown in FIG. 4, repeats the stand-by state and the activated state periodically. For example, the passenger detection ECU is timer-activated at an interval (cycle) of approximately one hour to implement, as a wake-up operation (operation in the activated state), the load sensor zero-point correction and the timer error calibration for approximately 10 seconds.

Furthermore, when the ignition key switch (IG-SW) 3 is turned on (which will be referred to hereinafter as "IG-ON"), the battery voltage is inputted through an IG (ignition) terminal 22 to the signal voltage comparator 12. When the inputted voltage to the signal voltage comparator 12 exceeds a reference (Ref) voltage, the signal voltage comparator 12 outputs an IG-SW ON (turning-on) signal to generate an external interrupt to the microcomputer 13. Upon receipt of the external interrupt, the microcomputer 13 starts the operation of the main clock timer based on the crystal oscillator 15 which has been placed into a stopped state. In addition, the microcomputer 13 turns on the current dissipation cutting circuit 14 to further supply the voltage through the external power supply terminal 23 to the external circuits such as the load sensors 31 to 34. Then, the microcomputer 13 receives the load detection values from the load sensors 31 to 34 through the external signal input terminal 24 to make a decision on the passenger state on the basis of the load detection values, that is, to make a decision between the presence and absence of a seated passenger, between an adult and a child, and the like. For example, when the sum of the load detection values from the load sensors 31 to 34 does not reach an unoccupied-seat threshold, a decision is made that the vehicle seat 5 is in an unoccupied state. On the other hand, if the sum of the load detection values is above the unoccupied-seat threshold but is below a passenger decision threshold, a decision is made that a child is sitting thereon. Moreover, if the sum of the lead detection values exceeds the passenger decision threshold, a decision is made that an adult is sitting thereon. This passenger state decision result is outputted through the external signal output terminal 25 to the air bag ECU 40. Incidentally, the sub-clock timer based on the CR oscillation circuit 16 continues the counting action even during the IG-ON.

Still furthermore, when the ignition key switch (IG-SW) 3 is turned off, the voltage at the IG terminal 22 becomes zero. Therefore, the inputted voltage to the signal voltage comparator 12 becomes below the Ref voltage and, hence, the output of the IG-SW ON signal stops. The stop of the output of the IG-SW ON signal terminates the decision processing on the passenger state in the microcomputer 13, thereby turning of the current dissipation cutting circuit 14 and stopping the main clock operation of the crystal oscillator 15.

Figure 5:
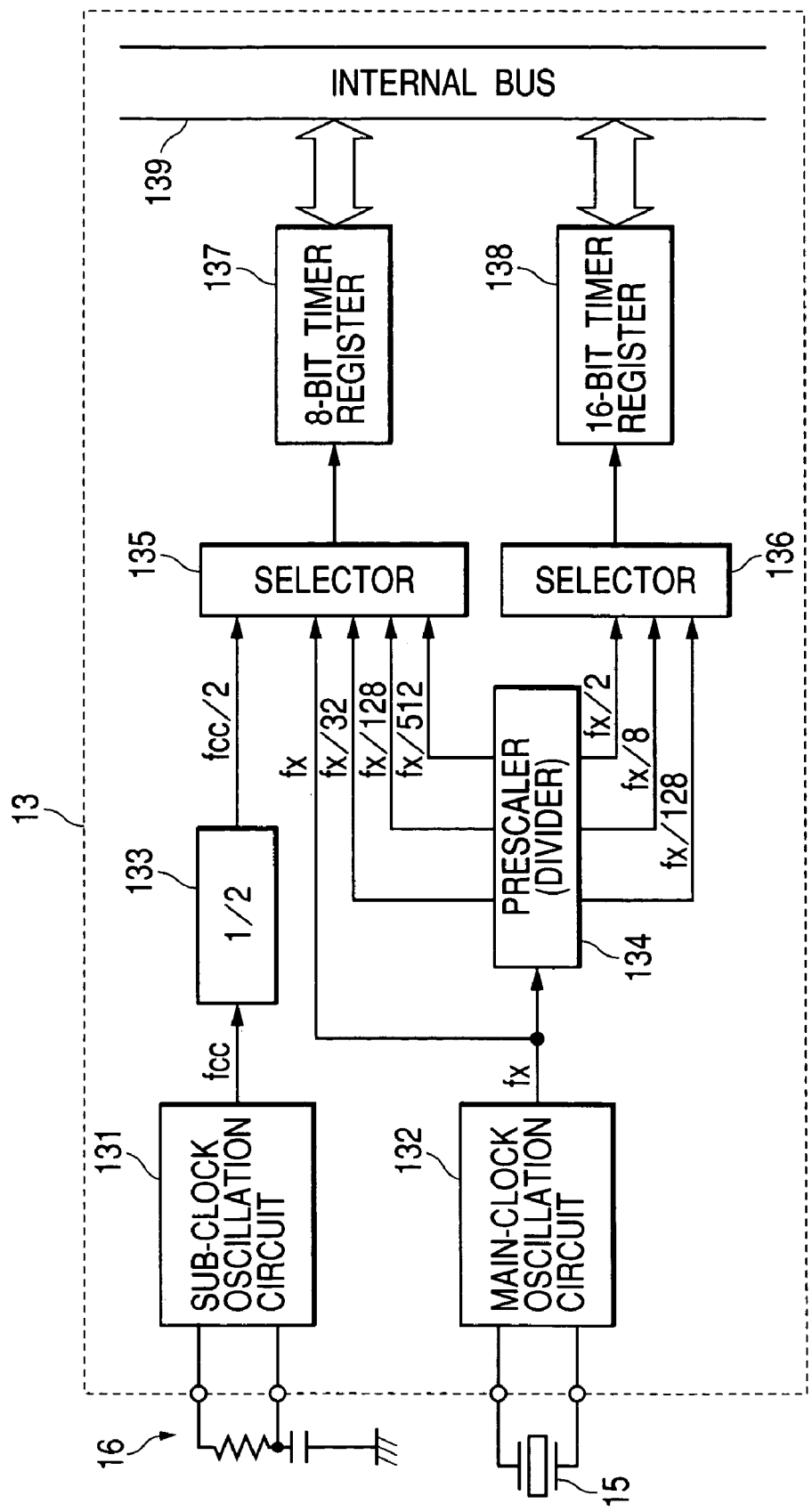
FIG. 5 is a block diagram showing a detailed configuration of a timer provided in the interior of a microcomputer.

In addition, referring to FIG. 5, a detailed description will be given hereinbelow of a timer configuration in the interior of the microcomputer 13. In FIG. 5, the microcomputer 13 internally includes a sub-clock oscillation circuit 131 connected to the CR oscillation circuit 16, a main clock oscillation circuit 132 connected to the crystal oscillator 15, frequency dividers 133, 134, selectors 135, 136, an 8-bit timer register 137, a 16-bit timer register 138 and an internal bus 139. The sub-clock oscillation circuit 131 outputs a clock signal fcc to input it to the frequency divider 133, while the main clock oscillation circuit 132 outputs a clock signal fx to input it to the selector 135 and the frequency divider 134. The 8-bit timer register 137 selects an fcc/2-clock signal, divided down by the frequency divider 133, through the selector 135. The 16-bit timer register 138 selects an fx/128-clock signal, divided down by the divider 134, through the selector 136. Moreover, the CPU fetches the value of the 16-bit timer register 138 when the 8-bit timer register 137 reaches a full state and sees a reference table, stored in the ROM, on the basis of the fetched value to calculate an integrated count value (number) of the 8-bit timer register 137 corresponding to a timer activation time. The storage area of the reference table in the ROM corresponds to the storage means in the present invention.

For example, when fcc=40 kHz and fx=8 MHz, the time taken until the 8-bit timer register 137 reaches the full state is $t=2^8/(40 \text{ kHz})/2)=12.8$ ms. Assuming that the timer activation time of the passenger detection ECU 10 is one hour, the number of times of full state of the 8-bit timer register 137 is 3600 sec/12.8 ms=281250. On the other hand, the count value of the 16-bit timer register 138 corresponding to 12.8 ms is 8 MHz/128*12.8 ms=800. Thus, in a case in which the value of the 16-bit timer register 138 when the 8-bit timer register 137 reaches the full state is 800 counts, the passenger detection ECU 10 is put into activation when the 8-bit timer register 137 takes the full state 281250 times.

In this case, in fact, since the CR oscillation shows a large variation error so that fcc=30~40~50 Hz, the count value of the 16-bit timer register 138 varies, such as 640~800~1066. Therefore, in this embodiment, the number of times of full state of the 8-bit timer register 137, when the passenger detection ECU 10 is to be activated, is stored in advance in the form of the reference table, and the number of times of the full state of the 8-bit timer register 137 corresponding to the timer activation time (for example, one hour) is obtained by referring to the reference table. The following table 1 is one example of storage contents of the reference table.

TABLE 1

Example of Reference Table

| Count Value of 16-Bit Timer Register at Calibration (Counts) | Number of Times of Full State of 8-Bit Timer Register Per Hour (Times/Hour) |
|---|---|
| 640 | 351562 |
| . | . |
| . | . |
| . | . |
| 799 | 281602 |
| 800 | 281250 |
| 801 | 280898 |
| 802 | 280548 |
| . | . |
| . | . |
| 850 | 264705 |
| . | . |
| . | . |
| 1066 | 212083 |

For example, in a case in which the value of the 16-bit timer register 138 at the calibration is 850 counts, after the stop of the main-clock-system oscillation (for example, 8 MHz), only the sub-clock-system performs the counting operation and, when the 8-bit timer register 137 reaches the full state 264705 times, the passenger detection ECU 10 is placed into activation (see Table 1).

Thus, in a manner such that the number of times of the full state of the 8-bit timer register 137 corresponding to the timer activation time is written in advance in the reference table, the CPU arithmetic processing load is reducible, and the non-linear characteristic calculable with simple multiplication/division is obtainable, thereby carrying out the timer error calibration with high precision.

For example, in a case in which the counting of the 16-bit timer register 138 delays due to the CPU processing load during the calibration, an error occurs in the calibration and difficulty is experienced in calibrating the error through simple addition or multiplication. In this embodiment, such an error can be calibrated through the adjustments according to the experiments made in the design stage or the like or through the use of the reference table made out on the basis of calculation results by a high-performance computer.

As obvious from the above description, in the vehicle passenger detection apparatus 1 which detects the loads applied onto the vehicle seat 5 by the load sensors 31 to 34 to make a decision on the passenger state on the basis of the load detection results, and carries out the timer counting operation with the direct power supply from the vehicle battery 2 and then comes into a stand-by mode and is put into activation when the preset timer activation time is counted to implement the zero-point correction on the load sensors 31 to 34, there are provided the crystal oscillator 15 serving as the first oscillation means for supplying a main clock signal when activated and the CR oscillation circuit 16 serving as the second oscillation means for supplying a sub-clock signal for a timer counting operation, wherein the accuracy of the timer count using the sub-clock signal is calibrated through the use of the main clock signal. Accordingly, the timer counting operation can be conducted in a low current dissipation state through the use of the sub-clock signal from the CR oscillation circuit 16 with a low frequency, and the accuracy of the timer count using the sub-clock signal can surely be calibrated through the use of the main clock signal from the crystal oscillator 15 having a high precision and a high stability. This enables the zero-point correction to be made on the load sensors 31 to 34 and others in a predetermined cycle so that the decision on the passenger state can be made on the basis of the load detection results with high accuracy at all times.

Figure 6:
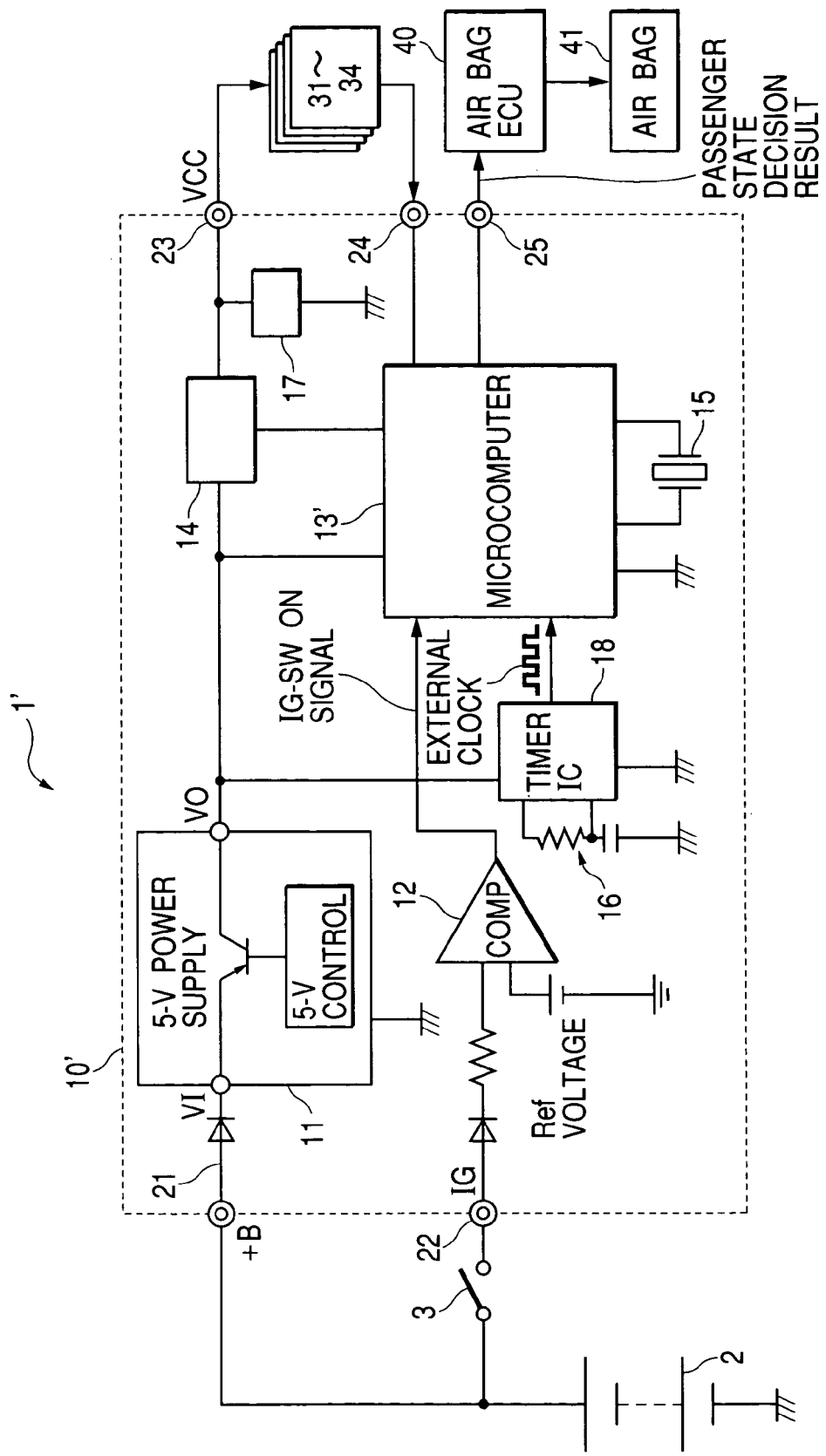
FIG. 6 is a block diagram showing a hardware configuration of a vehicle passenger detection apparatus according to a second embodiment of the present invention.
Figure 7:
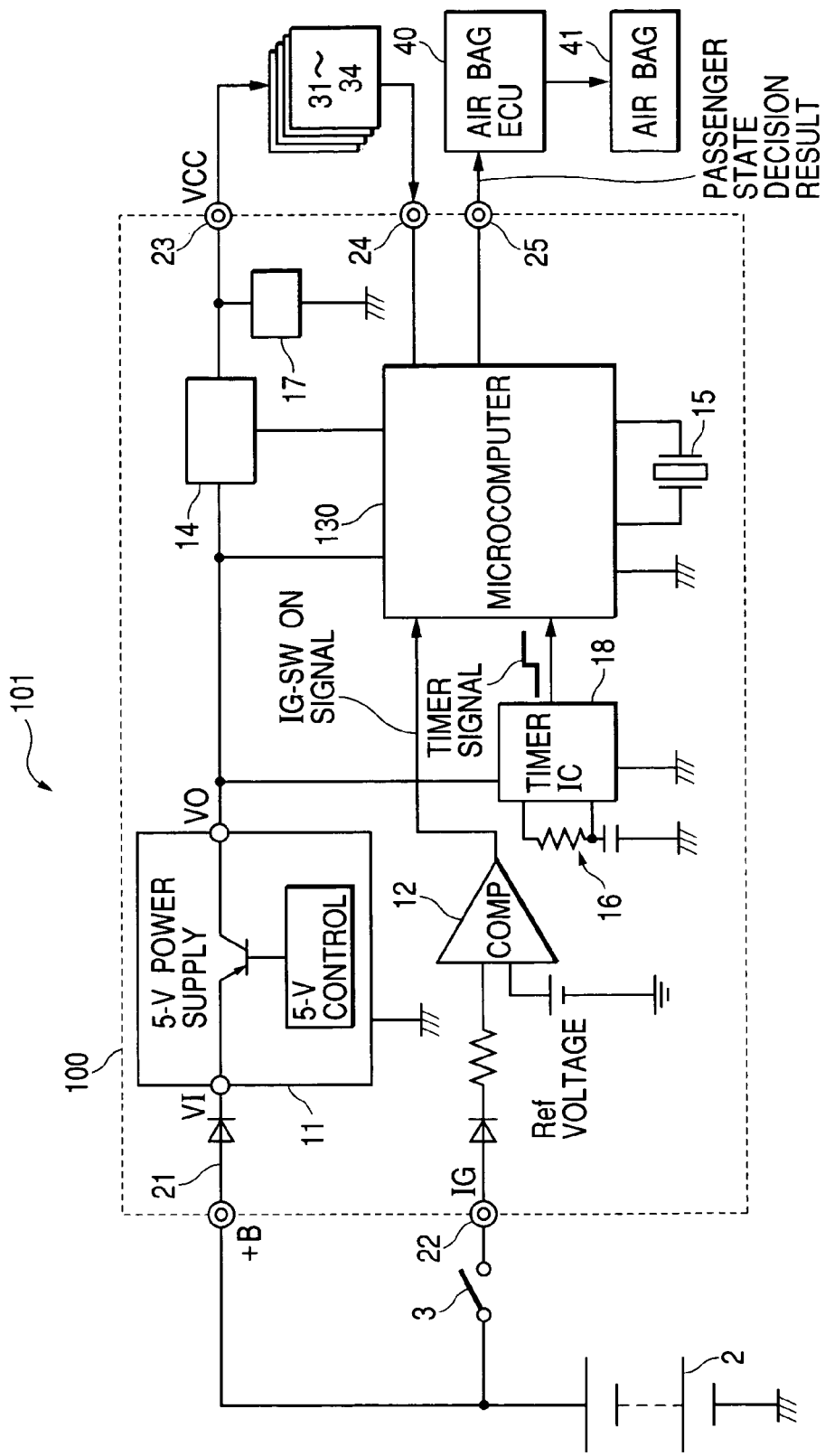
FIG. 7 is a block diagram showing a hardware configuration of a conventional vehicle passenger detection apparatus.

Secondly, referring to FIG. 6, a description will be given hereinbelow of a second embodiment of the present invention. The same arrangements as those in the first embodiment are marked with the same reference numerals and the description thereof will be omitted for brevity.

Although in the first embodiment the sub-clock oscillation circuit 131 using the CR oscillation is provided in the interior of the microcomputer 13, in this embodiment, a timer circuit 18 is provided separately from a microcomputer 13' in order to produce an CR oscillation clock signal serving as a sub-clock signal, without putting a CR oscillation circuit in the microcomputer 13', with a clock waveform being inputted to the microcomputer 13' to perform the timer counting operation on the basis of the input of an external clock signal. In this embodiment, although the current dissipation becomes relatively large because the timer circuit 18 outputs the waveform at all times, the timer count based on the sub-clock signal inputted from the external can surely be calibrated through the use of the main clock signal from the crystal oscillator 15 incorporated into the microcomputer 13'.

It should be understood that the present invention is not limited to the above-described embodiments, and that it is intended to cover all changes and modifications of the embodiments of the invention herein which do not constitute departures from the spirit and scope of the invention.

For example, although in the above-described embodiments the present invention is applied to a vehicle passenger detection apparatus, the present invention is also applicable to another vehicle electronic control unit which is activated periodically through the use of a timer. For example, it is also appropriate that the vehicle electronic control unit according to the present invention is used for a vehicle antitheft apparatus or the like.

In addition, although in the above-described embodiments a crystal oscillator is used as the first oscillation means, it is also appropriate to employ another oscillator using mechanical resonance, for example, a ceramic oscillator.

Additionally, although in the above-described embodiments a reference table in which the main clock count result and the sub-clock count value corresponding to the timer activation time are associated with each other is stored in the ROM of the microcomputer 13 in advance so that the timer count accuracy is calibrated by referring to the reference table, it is also appropriate that the sub-clock count value corresponding to the timer activation time is obtained through calculations on the basis of the main clock count result.

Still additionally, although in the above-described embodiments a count value on the main clock signal is measured in conjunction with a given (predetermined) sub-clock count value (the count value at which the 8-bit timer register takes the full state) to calibrate the accuracy of the sub-clock timer count on the basis of the main clock count value, it is also appropriate that a count value on the sub-clock signal is measured in conjunction with a given main clock count value to calibrate the sub-clock timer count accuracy on the basis of the sub-clock count result through the use of a reference table, or that the sub-clock count value corresponding to the timer activation time is obtained through calculations on the basis of the sub-clock count result.

Although in the above-described embodiments the passenger state decision result is transmitted to the air bag ECU 40, it is also appropriate that the passenger state decision result is transmitted to another vehicle passenger protection apparatus such as a seat belt with pretension or a control unit for a device for taking up a seat belt repeatedly through the use of a motor or the like.

What is claimed is:

1. An electronic control unit for a vehicle which is made to carry out a count through the use of a timer in response to a direct power supply from a battery and to fall into a stand-by state and which is placed into an activation when a count value reaches a preset timer activation time or when an ignition key is turned on, said control unit comprising:
   first oscillation means for supplying a main clock signal at the activation; and
   second oscillation means for supplying a sub-clock signal to carry out the timer count,
   with the accuracy of the timer count using said sub-clock signal being calibrated through the use of said main clock signal.

2. The unit according to claim 1, wherein an oscillation frequency of said second oscillation means is lower than an oscillation frequency of said first oscillation means.

3. The unit according to claim 1, wherein said first oscillation means comprises an oscillator using mechanical resonance while said second oscillation means comprises an oscillator using electrical resonance.

4. The unit according to claim 3, wherein said first oscillation means comprises one of a crystal oscillator and a ceramic oscillator while said second oscillation means comprises a CR oscillation circuit.

5. The unit according to claim 1, further comprising a microcomputer made to operate on the basis of said main clock signal fed from said first oscillation means, with said first and second oscillation means being incorporated into said microcomputer.

6. The unit according to claim 1, further comprising:
a microcomputer made to operate on the basis of said main clock signal fed from said first oscillation means; and
a timer circuit made to operate on the basis of said sub-clock signal fed from said second oscillation means,
with a clock waveform outputted from said timer circuit being externally inputted to said microcomputer.

7. The unit according to claim 1, wherein a count of said sub-clock signal is made with respect to a given count value of said main clock signal, and the accuracy of the timer count using said sub-clock signal is calibrated on the basis of a sub-dock count result.

8. The unit according to claim 7, further comprising storage means in which the sub-clock count result and a sub-clock count value corresponding to said timer activation time are stored in a state where they are associated with each other.

9. The unit according to claim 7, wherein a sub-clock count value corresponding to said timer activation time is calculated on the basis of the sub-clock count result.

10. The unit according to claim 1, wherein a count of said main clock signal is made with respect to a given count value of said sub-clock signal, and the accuracy of the timer count using said sub-clock signal is calibrated on the basis of a main clock count result.

11. The unit according to claim 10, further comprising storage means in which the main clock count result and a sub-clock count value corresponding to said timer activation time are stored in a state where they are associated with each other.

12. The unit according to claim 10, wherein a sub-clock count value corresponding to said timer activation time is calculated on the basis of the main clock count result.

13. The unit according to claim 1, wherein, whenever the activation is made periodically through the timer count using said sub-clock signal, the accuracy of the timer count using said sub-clock signal is calibrated through the use of said main clock signal.

14. A passenger detection apparatus for a vehicle made to detect a load on a vehicle seat Through the use of a load sensor for making a decision on a state of a passenger on the basis of a load detection result and to implement a count through a timer upon receipt of direct power supply from a battery and take a stand-by condition and made to be activated when a count value reaches a preset timer activation time for carrying out a zero-point correction on said load sensor, said apparatus comprising:
first oscillation means for supplying a main clock signal at the activation; and
second oscillation means for supplying a sub-clock signal to implement the timer count,
with the accuracy of the timer count using said sub-clock signal being calibrated through the use of said main clock signal.

15. The apparatus according to claim 14, wherein an oscillation frequency of said second oscillation means is lower than an oscillation frequency of said first oscillation means.

16. The apparatus according to claim 14, wherein said first oscillation means comprises an oscillator using mechanical resonance while said second oscillation means comprises an oscillator using electrical resonance.

17. The apparatus according to claim 16, wherein said first oscillation means comprises one of a crystal oscillator and a ceramic oscillator while said second oscillation means comprises a CR oscillation circuit.

18. The apparatus according to claim 14, further comprising a microcomputer made to operate on the basis of said main clock signal fed from said first oscillation means, with said first and second oscillation means being incorporated into said microcomputer.

19. The apparatus according to claim 14, further comprising:
a microcomputer made to operate on the basis of said main clock signal fed from said first oscillation means; and
a timer circuit made to operate on the basis of said sub-clock signal fed from said second oscillation means,
with a clock waveform outputted from said timer circuit being externally inputted to said microcomputer.

20. The apparatus according to claim 14, wherein a count of said sub-clock signal is made with respect to a given count value of said main clock signal, and the accuracy of the timer count using said sub-clock signal is calibrated on the basis of a sub-clock count result.

21. The apparatus according to claim 14, further comprising storage means in which the sub-clock count result and a sub-clock count value corresponding to said timer activation time are stored in a state where they are associated with each other.

22. The apparatus according to claim 20, wherein a sub-clock count value corresponding to said timer activation time is calculated on the basis of the sub-clock count result.

23. The apparatus according to claim 14, wherein a count of said main clock signal is made with respect to a given count value of said sub-clock signal, and the accuracy of the timer count using said sub-clock signal is calibrated on the basis of a main clock count result.

24. The apparatus according to claim 23, further comprising storage means in which the main clock count result and a sub-clock count value corresponding to said timer activation time are stored in a state where they are associated with each other.

25. The apparatus according to claim 23, wherein a sub-clock count value corresponding to said timer activation time is calculated on the basis of the main clock count result.

26. The apparatus according to claim 14, wherein, whenever the activation is made periodically through the timer count using said sub-clock signal, the accuracy of the timer count using said sub-clock signal is calibrated through the use of said main clock signal.

27. The unit according to claim 1, wherein said first oscillation means is configured to stop oscillating operation thereof during a time period in which said count value does not reach said preset timer activation time, and said ignition key is not turned on.

28. The apparatus according to claim 14, wherein said first oscillation means is configured to stop oscillating operation thereof during a time period in which said count value does not reach said preset timer activation time, and an ignition key is not turned on.

* * * * *